(12) United States Patent
Zhang (10) Patent No.: US 11,891,882 B2
(45) Date of Patent: Feb. 6, 2024

(54) CLASSIFYING DOWNHOLE TEST DATA

(71) Applicant: Landmark Graphics Corporation, Houston, TX (US)

(72) Inventor: Jiazuo Zhang, London (GB)

(73) Assignee: Landmark Graphics Corporation, Houston, TX (US)

( * ) Notice: Subject to any disclaimer, the term of this patent is extended or adjusted under 35 U.S.C. 154(b) by 457 days.

(21) Appl. No.: 16/932,056

(22) Filed: Jul. 17, 2020

(65) Prior Publication Data
US 2022/0018221 A1 Jan. 20, 2022

(51) Int. Cl.
*G06F 17/18* (2006.01)
*G06F 18/22* (2023.01)
(Continued)

(52) U.S. Cl.
CPC .............. *E21B 43/00* (2013.01); *G06F 17/16* (2013.01); *G06F 17/18* (2013.01); *G06F 18/22* (2023.01); *G06F 18/2431* (2023.01); *G06N 20/20* (2019.01)

(58) Field of Classification Search
CPC ...... E21B 43/00; E21B 49/00; E21B 2200/22; G06F 17/16; G06F 17/18; G06F 18/22;
(Continued)

(56) References Cited

U.S. PATENT DOCUMENTS 7,117,188 B2 * 10/2006 Guyon .................. G16B 40/30
706/19
8,311,967 B1 11/2012 Lin et al.
(Continued)

FOREIGN PATENT DOCUMENTS

| CN | 109919184 A | 6/2019 | |
|---|---|---|---|
| NO | 20210792 | * 6/2016 | ............ E21B 49/00 |

(Continued)

OTHER PUBLICATIONS

PCT Application Serial No. PCT/US2020/042698, International Search Report, dated Apr. 2, 2021, 3 pages.
(Continued)

*Primary Examiner* — Juan C Ochoa
(74) *Attorney, Agent, or Firm* — DeLizio, Peacock, Lewin & Guerra, LLP (57) ABSTRACT

Disclosed embodiments include methods and systems for classifying test data. In one embodiment a method includes determining one or more variable types in a multivariate test vector within a data set, and for a plurality of machine-learning models, determining a closest match between variable types used by (to train) the machine-learning models and the determined variable types for the test vector. In response to determining a closest match for one machine-learning model, a corresponding machine-learning model is selected and the test vector is classified using the selected model. In response to determining a closest match for multiple machine-learning models, a similarity is determined between a probability distribution for the test data set and the probability distributions for the multiple machine-learning models to generate similarity values for each of the models. In response to one of the similarity values exceeding a threshold value, a machine-learning model is selected that corresponds to the exceeding similarity value and the test vector is classified using the selected model.

20 Claims, 7 Drawing Sheets

(51) Int. Cl.
  *E21B 43/00* (2006.01)
  *G06N 20/20* (2019.01)
  *G06F 17/16* (2006.01)
  *G06F 18/2431* (2023.01)

(58) Field of Classification Search
  CPC .. G06F 18/2431; G06K 9/6215; G06K 9/628; G06N 20/20
  USPC ...................................................... 703/10, 2
  See application file for complete search history.

(56) References Cited

U.S. PATENT DOCUMENTS

| | | | |
|---|---|---|---|
| 11,200,514 B1* | 12/2021 | Chen | G06N 20/00 |
| 11,480,709 B2* | 10/2022 | Thorne | G06N 20/00 |
| 2010/0063948 A1 | 3/2010 | Virkar et al. | |
| 2013/0124176 A1 | 5/2013 | Fox et al. | |
| 2016/0132787 A1 | 5/2016 | Drevo et al. | |
| 2017/0032279 A1 | 2/2017 | Miserendino et al. | |
| 2018/0347354 A1 | 12/2018 | Li et al. | |
| 2019/0108460 A1 | 4/2019 | Chien et al. | |
| 2020/0132875 A1* | 4/2020 | Zhang | E21B 47/003 |
| 2020/0184494 A1 | 6/2020 | Joseph et al. | |

FOREIGN PATENT DOCUMENTS

| | | | | |
|---|---|---|---|---|
| RU | WO2018117890 | * | 6/2018 | ............. G06F 15/18 |
| WO | 2013188241 A2 | | 12/2013 | |
| WO | 2018117890 A1 | | 6/2018 | |
| WO | 2019204555 A1 | | 10/2019 | |
| WO | 2021040791 A1 | | 4/2021 | |
| WO | 2022015335 A1 | | 1/2022 | |

OTHER PUBLICATIONS

PCT Application Serial No. PCT/US2020/042698, International Written Opinion, dated Apr. 2, 2021, 4 pages.
GB Application No. 2108570.9, Combined Search & Examination Report, dated Dec. 16, 2021, 7 pages.
NO U.S. Appl. No. 20/210,792, Office Action, dated Sep. 16, 2021, 4 pages.
NO U.S. Appl. No. 20/210,792, Search Report, dated Sep. 16, 2021, 2 pages.
Elseaidy, "Static and Dynamic Analysis of Real-Time Systems", In Proceedings of the 30th annual Southeast regional conference (ACM-SE 30). Association for Computing Machinery, New York, NY, USA, 368-376. doi: https://doi.org/10.1145/503720.503801.
Leontjeva, et al., "Combining Static and Dynamic Features for Multivariate Sequence Classification", 2016 IEEE International Conference on Data Science and Advanced Analytics (DSAA), 2016, pp. 21-30. doi: 10.1109/DSAA.2016.10.

* cited by examiner

CLASSIFYING DOWNHOLE TEST DATA

BACKGROUND

The disclosure generally relates to downhole testing and in particular to generating and utilizing supervised machine-learning models to classify downhole test data.

During drilling of a wellbore, downhole test tools may be deployed in a bottom hole assembly (BHA) or elsewhere along the drill string to detect and measure various formation properties. Such downhole testing may also or alternatively be implemented by wireline test tools deployed following or between drilling cycles. Such test tools may include multi-component induction (MCI) and nuclear magnetic resonance (NMR) tools that measure electromagnetic return signals that can be interpreted to determine higher-level formation properties such as porosity, permeability, and density of formation materials such as rock strata and fluids. Many different downhole test tools are utilized for measuring various electrical, acoustic, nuclear radiation, and other measurable metrics that can be interpreted individually and/or in various combinations to determine mechanical, chemical, and other formation properties. The directly measurable metrics may also be used to determine higher-level formation material classifications such as lithology. The interpretation process to determine property classifications from measured data may require substantial processing and user resources.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

Determining the rock and fluid properties during various stages of drilling is critical to efficient and successful formation exploration efforts. Such material properties determinations depend on obtaining measurable indicators such as measurable electromagnetic, acoustic, nuclear, or other signal responses or conditions. Such measured test data can be interpreted such as by human lab analysts and/or processing component to determine or estimate material properties and higher-level material identifiers such as lithology.

Disclosed embodiments include methods, systems, tools, and components for optimizing the use of supervised machine-learning models (MLMs) to interpret and classify sets of downhole test data. Downhole materials analysis is particularly complex due to the remoteness and relative inaccessibility of the formation materials from being physically collected in sufficiently large quantities and with sufficient frequency to enable direct chemical and physical analysis. Consequently, a large variety of test tools such as NMR imaging tools, induction resistivity measurement tools, acoustic measurement tools and others provide lower-level properties measurements. The measurements may be interpreted individually or in various combinations to determine higher-level formation properties such as porosity, permeability, density, chemical composition, lithology, etc. Methods and systems may configure and utilize supervised MLMs in a manner that addresses the complexities of using different types of measurement tools and different sets of different combinations of measurement tools that yield a vast variety of different types and combinations of test data. Disclosed embodiments may additionally or alternatively configure and utilize supervised MLMs in a manner that addresses the vast spatial and temporal variability in downhole environments and conditions.

In some embodiments, the methods and systems implement a model database and model selection architecture configured to simultaneously address dual variabilities that may affect MLM accuracy for downhole test data applications. In one aspect, a supervised MLM library, database, or other form of programmatically accessible repository is configured to enable selective access to multiple MLMs during and as part of test data classification. The MLM repository is defined in part as including MLMs individually and mutually defined based on the training data sets used to train the MLMs. In another aspect, a model selection component is configured to apply a hierarchical sequence of criteria to efficiently and effectively match differently trained MLMs with multivariate test points (also referred to as multivariate test vectors) within downhole test data sets.

Example Illustrations

Figure 1:
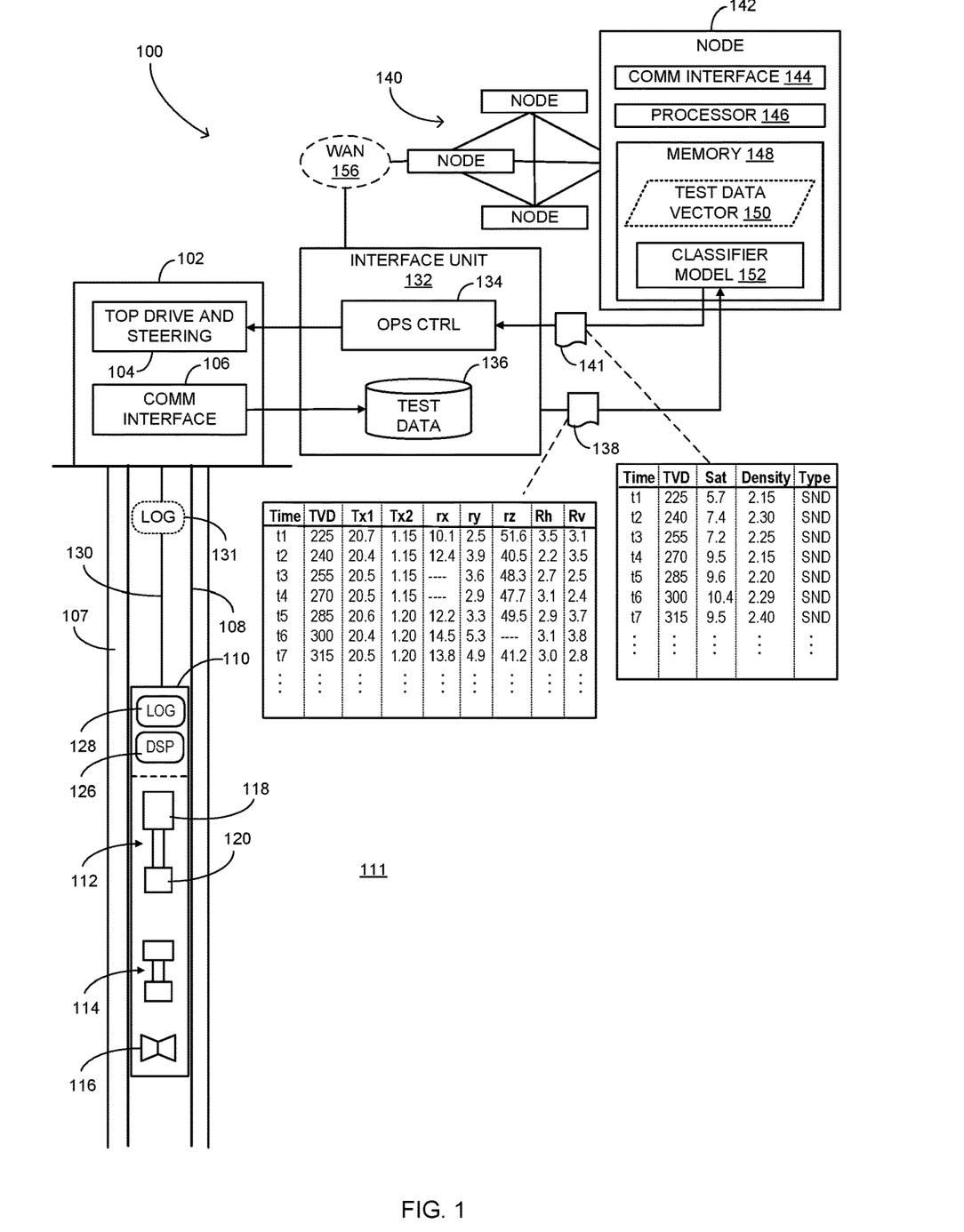
FIG. 1 is a block diagram depicting a formation test system in accordance with some embodiments.

FIG. 1 is a block diagram depicting a formation test system 100 that includes components for collecting and classifying downhole test data in accordance with some embodiments. Formation test system 100 includes a well head 102 comprising components for drilling and testing within a formation 111, which may be a petroleum reservoir. Wellhead 102 comprises mechanical, electrical, and electronic systems, subsystems, devices, and components for drilling a wellbore 107 and performing downhole testing during drilling or following or between drilling intervals. The components within wellhead 102 include drilling and test equipment including top drive and steering equipment 104 and a communication interface 106. Top drive and steering equipment 104 include systems and components configured to provide torque to a drill string to drill wellbore 107. Top drive and steering equipment 104 further include a control interface for generating and transmitting steering control signals to steering components on the drilling string such as rotary steerable system components.

Communication interface 106 is configured to provide signal communication with locally networked components such as downhole measurement tools and a local processing interface unit 132. Communication interface 106 may include components configured to enable multi-lateral signal transmission between processing nodes within a machine-learning system 140, a downhole measurement tool 110, and other local components. During measurement logging operations, measurement tool 110 is disposed (e.g., via wireline or logging while drilling (LWD)) at various depths within wellbore 107 while communicatively coupled to communication interface 106 via a telemetry link 130. Telemetry link 130 may comprise components and connectivity media for establishing acoustic, optical, electronic, and/or electromagnetic communications links between measurement tool 110, interface unit 132, and machine-learning system 140.

Whether deployed in a wireline or LWD configuration, measurement tool 110 may be deployed within a tubing string 108 in wellbore 107. Tubing string 108 may comprise drilling tubing such as drill pipes, production tubing, injection tubing, or other type of movable tubing. Wellhead 102 may include components for configuring and controlling deployment in terms of insertion and withdrawal within wellbore 107 of a test string that incorporates measurement tool 110. The test string may be configured as a wireline test string deployed in the absence of or within tubing string 108 and may include a wireline cable represented as telemetry link 130 for moving and providing communication and power source connectivity for downhole test tools.

Measurement tool 110 comprises one or more logging sondes that house various downhole measurement tools including a multi-component induction (MCI) tool 112, a nuclear magnetic resonance (NMR) tool 114, and an acoustic measurement tool 116. MCI tool 112 includes a multi-coil antenna array including a transmitter 118 and one or more receivers 120. Resistivity measurement tools such as MCI tool 112 may use a triaxial antenna configuration that enables multi-component electromagnetic field measurements in three dimensions. Transmitter 118 may therefore include one or more transmit antennas configured to transmit at multiple different geometric orientations. Receivers 120 may comprise a set of receiver antennas configured to receive at multiple different geometric orientations.

The signals measured by receivers 120 may be translated by inversion computation processes into dimensionally specified resistivity and/or conductivity values. For example, if processed using a transverse isotropic modeling technique, the measured voltage signal components may be translated to a horizontal resistivity, $R_h$, that represents the x-y plane, and a vertical resistivity, $R_v$, in the z-direction. If processed using a biaxial anisotropy modeling technique, the measured voltage components are translated into three mutually orthogonal horizontal resistivity components. Similar to MCI tool 112, NMR tool 114 and acoustic measurement tool 116 may include transmitter components for inducing responses and receiver components for measuring and, in some instances, translating corresponding signal responses.

Downhole measurement tool 110 further includes an electronics assembly comprising, in part, a digital signal processor (DSP) 126 configured to process and convert raw measurement signals from receivers within MCI tool 112, NMR tool 114, and acoustic measurement tool 116 into measurement data. For example, DSP 126 may be configured to determine target metric values (e.g., voltage levels) corresponding to the signal information received directly from the measurement tools. The electronics assembly further includes a log unit 128 that is configured to compute measurement values from the target metric values determined by DSP 126. In some embodiments, log unit 128 applies an inversion computation to derive the resistivity values from the raw measurement data from DSP 126.

The generated measurement data may be recorded by log unit 128 in defined data object structures such as a log file 131. Log file 131 is transmitted from the electronics assembly to communication interface 106 from which it may be routed to and recorded in a test measurement storage 136 within interface unit 132. Log file 131 may also or alternatively be provided directly as streamed data or otherwise real-time formatted data to a processing node within machine-learning system 140. As represented by illustrative records within test data records 138, log file 131 includes multiple records that each associate a borehole depth (depicted as true vertical depth (TVD)) with the corresponding measurements collected at the depth. For instance, the third row-wise record within test data records 138 associates resistivity measurements $R_h$=2.7 and $R_v$=2.5 (e.g., ohms-m) with the TVD of 255 depth units (e.g., meters, feet) at which the measurements were collected. The third row-wise record further includes lower-level measurement datapoints including first and second transmitter values Tx1 and Tx2 (e.g., frequency and amplitude) and three received signal values rx, ry, and rz. In this manner, each row-wise record forms a multivariate test data vector having variable types $R_h$, $R_v$, Tx1, Tx2, rx, ry, and rz to be classified by processing components within machine-learning system 140. The collection of multiple test data vectors within test data records 138 forms a test data set.

The systems, components, operations, and functions described herein implement a method by which supervised machine-learning type artificial intelligence mechanisms are utilized to accurately and efficiently process test data sets generated by downhole measurement tools. More specifically, machine-learning models (MLMs) are configured and selectively called and executed for individual input test data vectors within an input test data set to address issues relating to variations in training set input variables and variations in training data sets that significantly affect model performance. In some embodiments, machine-learning system 140 generates formation properties data from test data 136 that was generated by measurement tool 110. The formation properties data may be stored, combined, and analyzed by formation analysis programs to evaluate the formation. Also, machine-learning system 140 in combination with interface unit 132, wellhead 102, and downhole equipment may utilize the formation property data for controlling or modifying control of drilling and other operations.

In some embodiments, interface unit 132 and/or wellhead 102 include an operations controller 134 that generates and transmit control signals to top drive and steering equipment 104. The control signals are transmitted to top drive and steering equipment 104 in direct, real-time sequential association with the sequence of formation properties data 141 received from a classifier model 152. Operations controller 134 may utilize the formation properties data 141 as a supplement to or otherwise in conjunction with other input or pre-programmed information to generate and transmit control setting signals for setting and modifying drilling and steering operations.

Formation properties data 141 includes multiple records that each associate a borehole depth (depicted as true vertical depth (TVD)) with corresponding to measurement depths recorded in test data records 138. For instance, the third row-wise record within formation properties data 141 corresponds by depth and time to the third row-wise record within test data records 138. Each row-wise record of formation properties data 141 further includes three formation properties fields including a water saturation field, "Sat," a density field, "Density," and a lithology type field, "Type." In some embodiment, one or more of the Sat, Density, and Type fields contain a label or classifier generated by classifier model based on the input test data vector formed by the third row of test data records 138. For example, the third row-wise record of formation properties data 141 classifies the test data pattern that includes resistivity measurements $R_h$=2.7 and $R_v$=2.5 and one or more of the transmitter values and receiver signal values forming the test pattern as corresponding to one or more of water saturation=7.2, density=2.25, and/or sandstone lithology type "SND."

Operations controller 134 generates the control settings in response to or otherwise based on classification information generated by and received from machine-learning system 140 via a local connection or via a wide area network 156. Interface unit 132 includes components such as electronic transmission and/or fluid pressure signal generating components for remotely communicating the control settings. In some embodiments, interface unit 132 transmits control setting signals to downhole devices via communication interface 106. Alternatively, interface unit 132 and downhole drilling and steering equipment may include wireless communication interfaces enabling communication with downhole and surface devices using, for example, acoustic telemetry via the metal piping of or fluid within tubing string 108.

The depicted machine-learning system 140 includes a multi-processor system including multiple interconnected processing nodes that may collectively form a parallel processing system that implements one or more types of machine-learning such as a neural network in which each node is a respective node of the neural network. Machine-learning system 140 comprises any combination of hardware, firmware, and software program logic configured to implement one or more artificial intelligence schemas such as linear regression, support vector machines, k-Nearest Neighbor (k-NN), and other supervised learning algorithms.

Interface unit 132 generates test data records 138 from measurement data recorded in a test measurement storage 136. Interface unit 132 transmits test data records 138 to one or more of the computation nodes, such as a node 142, within machine-learning system 140. Node 142 comprises processing and memory components as well other hardware and software components for receiving, storing, processing, and transmitting information to and from interface unit 132. Operations controller 134 may generate test data records 138 based on various combinations of measurement data within test measurement storage 136 such as by correlating measurement depths and/or timestamp values between recorded measurements to provide a time sequence of temporally and spatially corresponding measurement data. The test data sequence can be processed by machine-learning system 140 to determine formation properties in the form of supervised classifications recorded in formation properties data 141.

Node 142 includes a communication interface 144 that comprises any combination of hardware and software, such as network adapter components, configured to enable communication with the other nodes within machine-learning system 140 and interface unit 132. Node 142 further includes a processor 146 and a memory 148 for storing, executing, and otherwise processing program code and input data including classifier model 152 and a test data vector 150. Classifier model 152 may comprise a runtime-selectable plugin program or routine including program instructions configured to determine formation property classifications based on the content of test data vector 150. The formation property classifications may comprise a fixed set of labels (e.g., high, medium, low permeability) that each characterize various levels physical properties such as porosity, density, lithology, etc. As depicted and described in further detail with reference to FIG. 2, classifier model 152 may be generated, in part, by a model generator that generates pattern recognition code by executing a classification trainer program.

Test data vector 150 may comprising one of the test data vectors within test data records 138. Test data vector 150 is a multivariate vector data construct that includes specified parameters that in combination indicate a multivariate pattern. In some embodiments, the pattern includes multiple formation measurements and associated test input signals for a given test cycle. A series of test data vectors such as test data vector 150 may be included within a test data set such as test data records 138 and received as input and processed by classifier models such as classifier model 152 to generate formation property classifications. A current operational configuration (e.g., drilling) can be modified based on the formation property classifications and the entire process repeated as necessary based on a series of subsequent measurement cycles. In this manner, operational adjustments may be implemented based on changes in formation properties, which are identified based on the combined formation property classifications.

Figure 2:
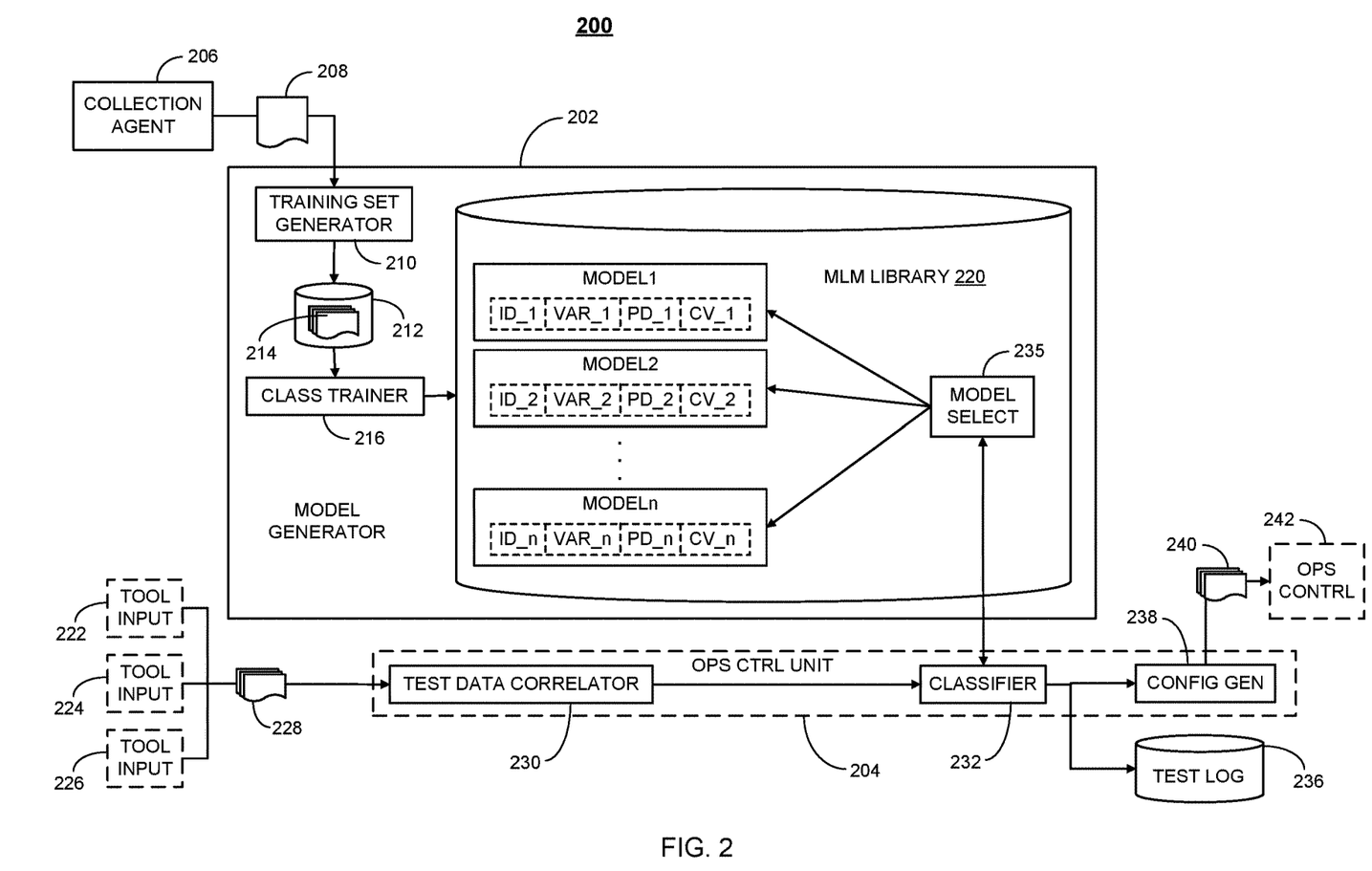
FIG. 2 is a block diagram of a test system that includes a test data classification subsystem configured in accordance with some embodiments.

FIG. 2 illustrates a test system 200 that includes a test data classification subsystem configured in accordance with some embodiments. The systems, subsystems, devices, and components depicted in FIG. 2 may be incorporated by and perform the function of the various of the test data collection devices and the processing devices in the machine-learning system shown in FIG. 1. Test system 200 includes a model generator 202 comprising components for generating an MLM repository in the form of an MLM library 220. Model generator 202 incudes a training set generator 210 that is configured to generate and record statistical properties of training sets 214 within a training set database 212.

In the depicted embodiment, training set generator 210 receives measurement and formation properties data 208 such as may be collected by a collection agent 206 that retrieves the data from a variety of information sources such as well field data repositories. Measurement and formation properties data 208 may include lower level measurement tool data such as voltages, signal frequencies, and radiation levels as well as higher level, translated measurement tool data including resistivities, densities, etc. Data 208 may further include higher-level formation properties such as lithologies and chemical compositions. Training set generator 210 is configured, using any combination of program instructions and data, to correlate the test measurement data with lower level properties data to form classified (sometimes referred to as "labelled") training sets within training sets 214. Specifically, a lower level property may be assigned as the classifier label for a multivariate set of measurement data points and/or other properties. Training set generator 210 is also configured to correlate the test measurement data and lower level properties data with higher level formation properties data to form classified training records within the training sets in which a higher-level property (e.g., lithology type) is assigned as the classifier label for a multivariate set of any combination of lower-level measurements and lower-level properties. Each of training sets 214 therefore includes a multivariate set of training variables (e.g., tool measurements and/or lower-level properties) associated with a classifier label (e.g., lower-level or high-level property).

Model generator 202 further includes a classification trainer 216 that is configured, using any combination of program instructions and data, to generate trained MLM models that each include respectively configured pattern recognition code. Classification trainer 216 requests or otherwise receives a training data set in the form of a subset of the supervised learning training sets 214 to generate a given model. Classification trainer 216 is configured to execute a supervised learning function on the labelled training data to generate the pattern recognition code. Classification trainer 216 processes the classifier-labeled training sets to generate multiple MLM models MODEL1-MODELn each having different sets of training variables (types of training data) and different sets of training data within the types.

The models MODEL1-MODELn are recorded actually or via index within MLM library 220, which includes a model select unit 235 that is configured to selectively access and retrieve one or more of the models. The models each include respectively configured pattern recognition code based on the training data content and training variables used to generate each model. As depicted, each of models MODEL1-MODELn also includes metadata fields for recording several categories of selection information. In the depicted embodiment, each model includes an identifier field "ID x" that records, for example, an alphanumeric model identifier. Each model also includes three metadata fields that record information relating to the training data set used to train that model. A training variable types field "VAR_x" records the set of variable types (e.g., voltage, frequency, density) included in the training set (set of training records) used to train the model. A probability distribution field "PD_x" records the probability distribution of the training data values used to train the model, and a cross-validation field "CV_x" records a cross-validation score for the model. In some embodiments, the cross-validation score represents classification accuracy based on a subset of the training data.

The models within MLM library 220 may be accessed by a control unit 204 that is configured to determine formation properties from input test data and provide the properties data for use in formation evaluation. Control unit 204 may also use the determined formation properties to determine or modify drilling or other operation configurations. Control unit 204 is configured to determine the formation properties as classifications generated by one or more of the models within MLM library 220. Control unit 204 includes a test data correlator 230 that receives and processes test data records 228 from one or more of multiple measurement tool test data sources 222, 224, and 226. Test data correlator 230 may process the test data by correlating various related measurements and low-level properties that may be usefully evaluated in combination to determine higher-level formation properties. The resultant unclassified data set comprises individual test data vectors, each comprising a respective combination of multivariate test data points.

A test data set comprising individual test data vectors are transmitted to or otherwise received by a classifier 232 that is configured, using any combination of program instructions and data, to process the test data set using the models within MLM library 220. In some embodiments, classifier 232 is configured to call or otherwise select one or more mutually distinct models from MLM library 220 to be used to classify individual test data vectors. As described and depicted in further detail with reference to FIG. 4, classifier 232 and model select unit 235 are configured to select a model for each test vector using a sequence of criteria that reduces MLM inaccuracies caused by the wide varieties of the input variable types and the training data values used to generate the models.

A test data classification sequence for a test data vector begins with classifier 232 or model select unit 235 determining the set of variable types in the test vector. For example, as part of a model request, classifier 232 may perform the determination or may transmit the test vector to be analyzed by model select unit 235. In response to model select unit 235 determining, directly or via indication from classifier 232, the set of variable types, model select unit 235 compares the set with the sets of variable types for each of the models (i.e., variable types included in the training sets for each model). Model select unit 235 performs the comparison in part by reading the associated via the VAR_x fields. In response to determining a closest match (e.g., largest set of matching variable types), model select unit 235 calls or otherwise selects the corresponding MLM model to be used to classify the test vector.

In response to determining that multiple models have closest matching sets of variable types, model select unit 235 and/or classifier 232 use comparison of probability distributions of the training data and test data values as the selection criterion. For example, classifier 232 may have pre-processed the values of the test data set in which the test vector is included to generate a probability distribution. For example, model select unit 235 and/or classifier 232 may calculate probability distributions using mean and covariance probability distribution calculations. Model select unit 235 may compare the probability distribution of the test data set with the probability distributions of each of the models that were determined to have the closest matching sets of variable types. The probability distributions for the models may be determined by reading the PD-x fields. For each comparison, model select unit 235 calculates a corresponding similarity values such as in the form of a numeric fractional or percent value. Model select unit 235 then determines whether one or more of the similarity values exceeds or otherwise meets a threshold value. In response to determining that only one of the similarity values exceeds the threshold value, model select unit 235 calls or otherwise selects the model corresponding to the exceeding similarity value and the model is used to classify the test vector.

In response to determining that two of more of the similarity values exceed the threshold value, model select unit 235 reads and compares cross-validation values stored in the CV_x field of each of the models for which the similarities values exceed the threshold value. Model select unit 235 identifies the model having the highest cross-validation value and calls or otherwise selects the model to be used to classify the test vector.

Having classified one or more test vectors in the test data set, classifier 232 transmits the classifications in the form of formation property data to configuration generator 238. Configuration generator 238 is configured to control or otherwise modify the operation settings of well equipment such as drilling and/or testing equipment. For example, configuration generator 238 may generate operation configuration control information/instructions 240 to an operational controller 242 such as a drilling controller.

Figure 3:
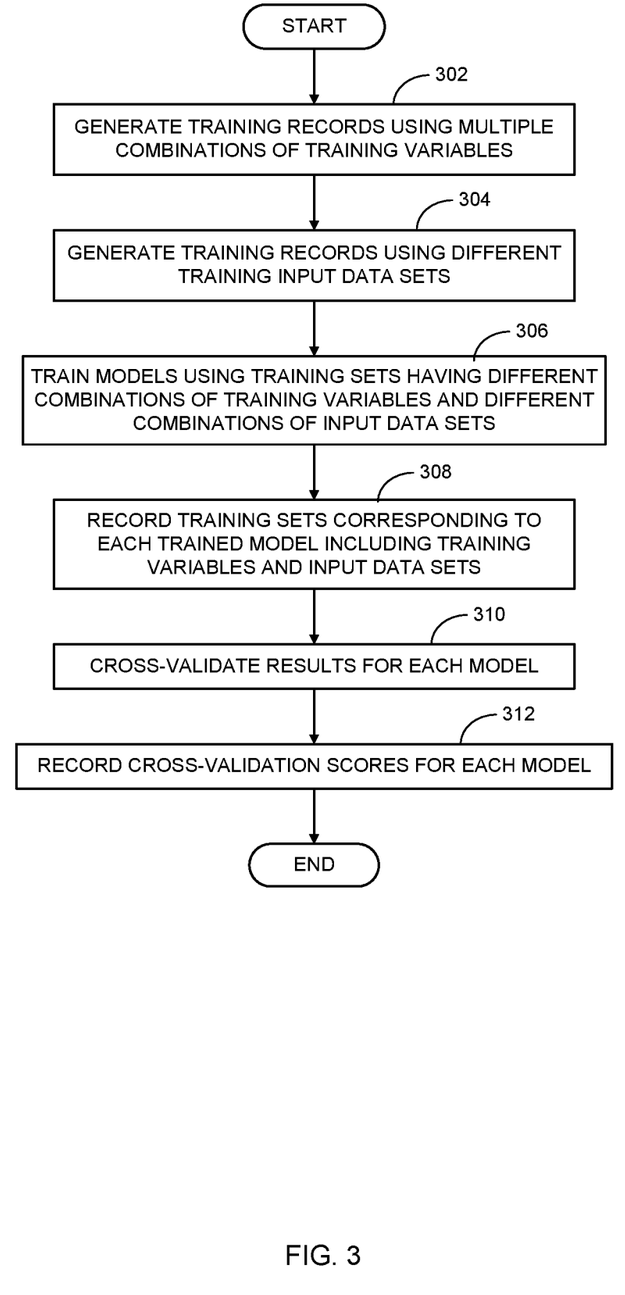
FIG. 3 is a flow diagram depicting operations and functions performed to generate a machine-learning model library or database in accordance with some embodiments.

FIG. 3 is a flow diagram depicting operations and functions performed to generate an MLM library or database in accordance with some embodiments. For example, the operations and function depicted and described with reference to FIG. 3 may be utilized to generate MLM library 220 in FIG. 2. The process begins as shown at block 302 with a training set generator generating training sets using multiple different combinations of training variables. As shown at block 304, the training sets are also generated using different data value content for the variables such that collections of the training sets will have different probability distributions.

Model training begins at block 306 with a classification trainer training models using training sets having differing combinations of training variables and different combinations of training data sets. As a result, a set of suitably variable models are generated that may be selectively called to classify individual test data points that may vary within a data set. For each individual model, the classification trainer or a processing unit that maintains the MLM library records data associated with the training data set used to train the model (block 308). For example, the classification trainer may record the set of training variables and the probability distribution for the training data set such as in metadata included in the model. At block 310, the classification trainer performs a cross-validation test for each model. For example, a subset of the training data set may be withheld from the pattern matching configuration training of a model and that data input to determine the accuracy of the model. The process ends as shown at block 312 with the classification trainer recording, such as within model metadata, the cross-validation values/scores for each of the models.

Figure 4:
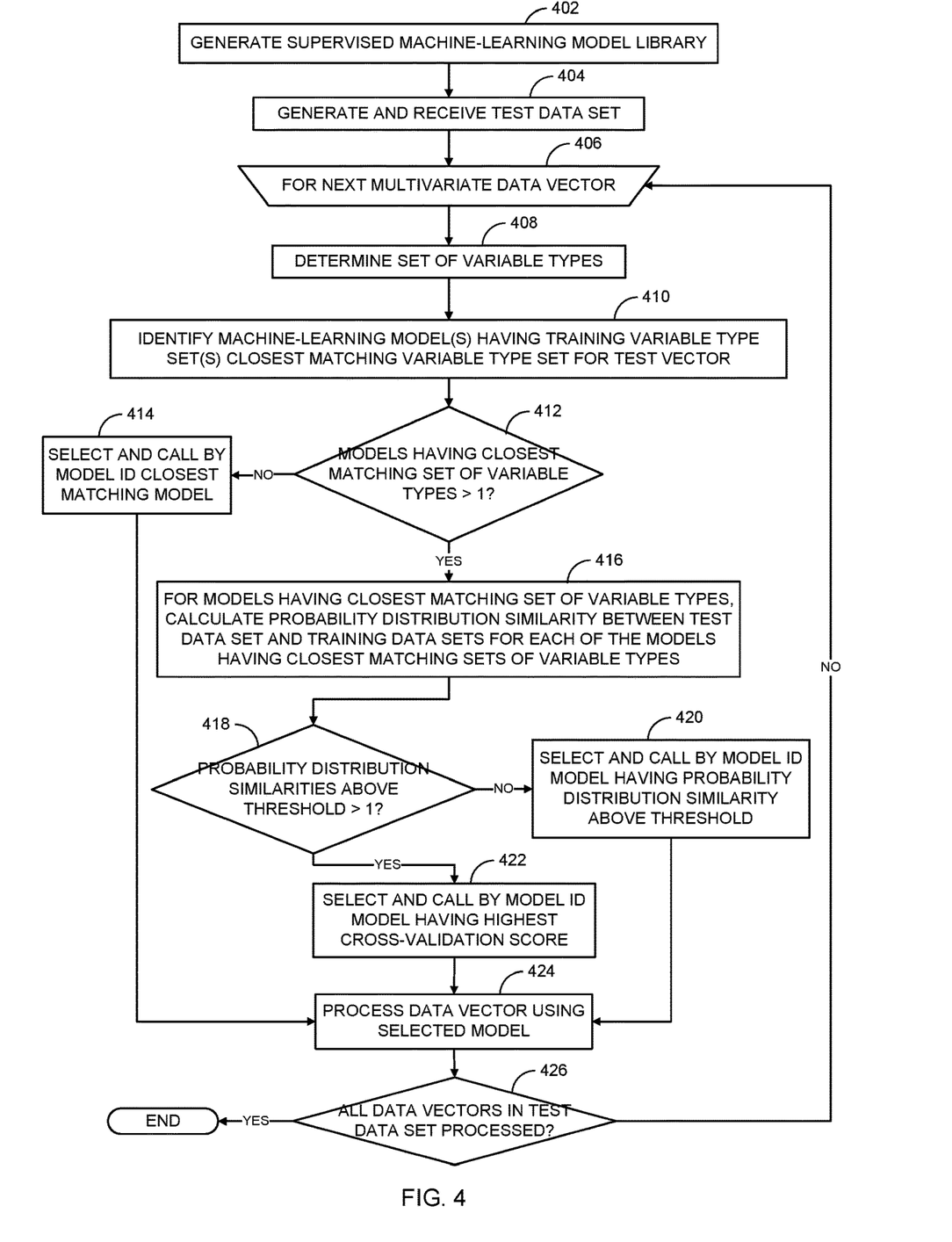
FIG. 4 is a flow diagram illustrating operations and functions for classifying downhole test data in accordance with some embodiments.

FIG. 4 is a flow diagram illustrating operations and functions for classifying downhole test data in accordance with some embodiments. The operations and functions depicted and described with reference to FIG. 4 may be implemented by one or more of the systems, devices, and components depicted in FIGS. 1 and 2. The process begins as shown at block 402 with a model generator, such as model generator 202 in FIG. 2, generating a supervised MLM library as described with reference to FIGS. 2 and 3. A test data set is generated such as via the downhole test system in FIG. 1 and received by a MLM system such as shown in FIGS. 1 and 2 to produce a data set comprising multiple multivariate data vectors (block 404).

Classification processing of the data set is performed by classifying at least some of the multivariate data vectors individually in a sequence beginning with block 406 with classification of a next test data vector in the set. The test data vector classification sequence begins at block 408 with a classifier and/or model select unit determining the set of variable types within the test data vector. At block 410, the classifier/model select unit compares the variable type set for the test data vector with the training variable type sets for the MLM models in the library to identify one or more closest matches. In response to determining a single closest match at inquiry block 412, control passes to block 414 with the classifier/model select unit selecting and calling the closest matching model by model ID. In response to determining more than one closest match at inquiry block 412, control passes to block 416 with the classifier/model select unit using probability distribution similarity as a model selection criterion. For example, the model select unit may determine a probability distribution for the test data set that includes the test vector. The model select unit compares the test data probability distribution with the probability distributions of each of the models determined at block 410 to have a variable type set closest matching to the variable type set of the test vector. For example, each comparison may be implemented by calculating a similarity value, such as a fraction or percent, between the test data set probability distribution and the probability distributions of the training data sets for the models. In some embodiments, determining a similarity between a probability distribution for the test data set and the probability distributions for the multiple machine-learning models comprises calculating distance between data points in the probability distribution for the test data set and data points in the probability distributions for the machine-leaning models. Furthermore, determining a similarity between a probability distribution for the test data set and the probability distributions for the multiple machine-learning models may include comparing probability distributions for the same variable types.

In response to determining that only one calculated similarity value exceeds a threshold value (block 418), control passes to block 420 with the model select unit selecting and calling the model having a probability distribution similarity above the threshold. In response to determining that more than one calculated similarity value exceeds the threshold (block 418), control passes to block 422 with the model select unit selecting and calling the model, among the models corresponding to the exceeding similarity values, a model having a highest cross-validation score. Following selection of a model to classify the test data vector at one of blocks 414, 420, or 422, a classifier processes the selected model to determine a formation property classification (block 424). If additional test vectors within the test data set remain to be classified as determined at inquiry block 426, control returns to block 406 to begin processing the next test vector until all of the test vectors are classified and the process ends.

Figure 5:
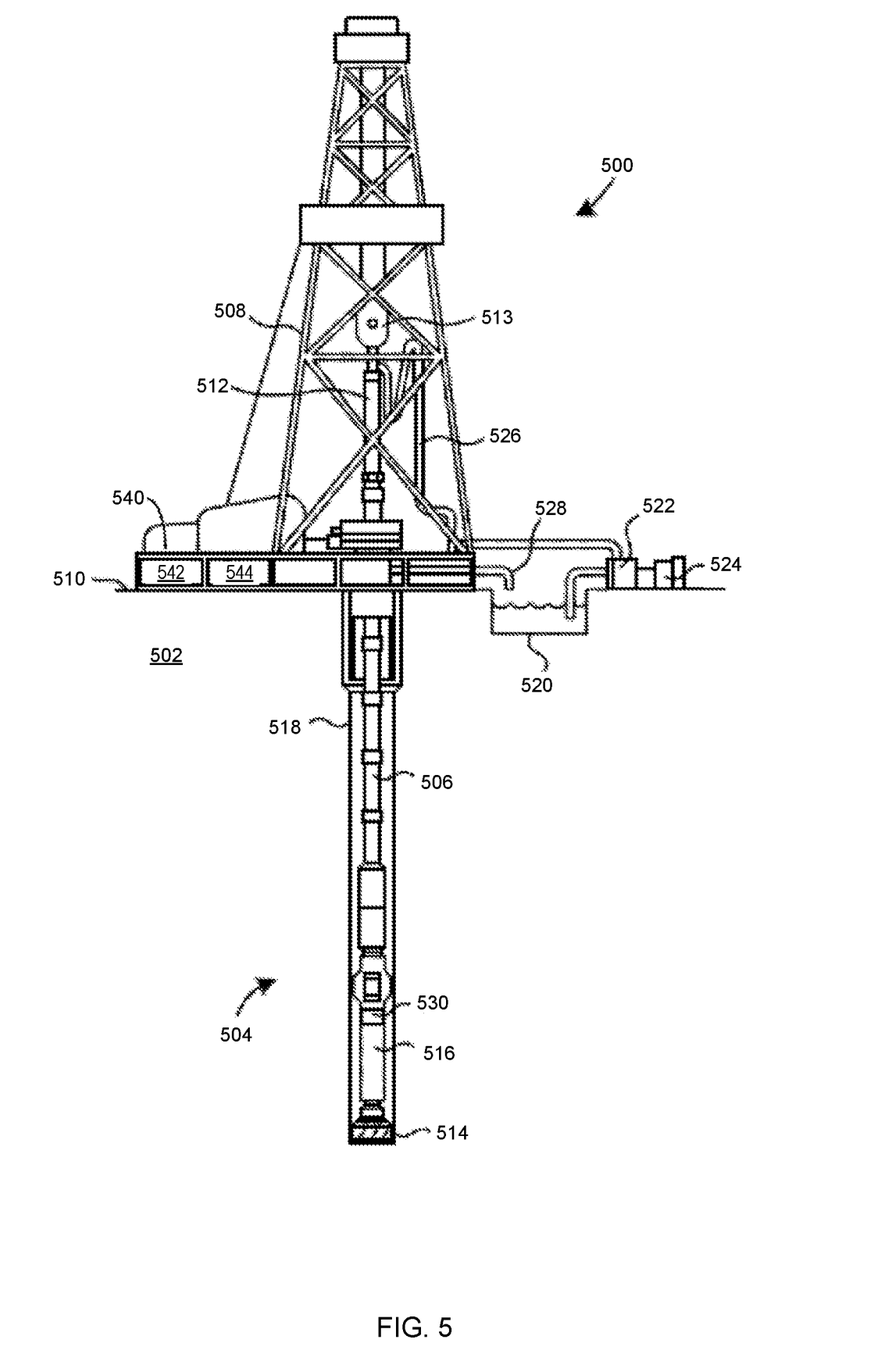
FIG. 5 depicts a drilling system in accordance with some embodiments.

FIG. 5 illustrates a drilling system 500 in accordance with some embodiments. Drilling system 500 is configured to include downhole measurement tools and sensors for measuring properties of downhole material such as formation material and downhole fluids. The measurements may be processed as test data for example to determine, using the machine-learning model generation and selection procedure described above, the lithological class and chemical composition of the downhole materials. The resultant downhole material properties information may be utilized for various purposes such as for modifying a drilling parameter or configuration, such as penetration rate or drilling direction, in a measurement-while-drilling (MWD) and a logging-while-drilling (LWD) operation. Drilling system 500 may be configured to drive a bottom hole assembly (BHA) 504 positioned or otherwise arranged at the bottom of a drill string 506 extended into the earth 502 from a derrick 508 arranged at the surface 510. Derrick 508 may include a kelly 512 and a traveling block 513 used to lower and raise kelly 512 and drill string 506.

BHA 504 may include a drill bit 514 operatively coupled to a tool string 516 that may be moved axially within a drilled wellbore 518 as attached to the drill string 506. During operation, drill bit 514 penetrates the earth 502 and thereby creates wellbore 518. BHA 504 may provide directional control of drill bit 514 as it advances into the earth 502. Tool string 516 can be semi-permanently mounted with various measurement tools (not shown) such as, but not limited to, MWD and LWD tools, that may be configured to perform downhole measurements of downhole conditions. In some embodiments, the measurement tools may be self-contained within tool string 516, as shown in FIG. 5.

Drilling fluid from a drilling fluid tank 520 may be pumped downhole using a pump 522 powered by an adjacent power source, such as a prime mover or motor 524. The drilling fluid may be pumped from the tank 520, through a stand pipe 526, which feeds the drilling fluid into drill string 506 and conveys the same to drill bit 514. The drilling fluid exits one or more nozzles arranged in drill bit 514 and in the process cools drill bit 514. After exiting drill bit 514, the drilling fluid circulates back to the surface 510 via the annulus defined between wellbore 518 and drill string 506, and in the process, returns drill cuttings and debris to the surface. The cuttings and mud mixture are passed through a flow line 528 and are processed such that a cleaned drilling fluid is returned down hole through stand pipe 526.

Tool string 516 may further include a downhole measurement tool 530 similar to the downhole tools described herein. Downhole tool 530 may be controlled from the surface 510 by a computer 540 having a memory 542 and a processor 544. Accordingly, memory 542 may store commands that, when executed by processor 544, cause computer 540 to perform at least some steps in methods consistent with the present disclosure.

Figure 6:
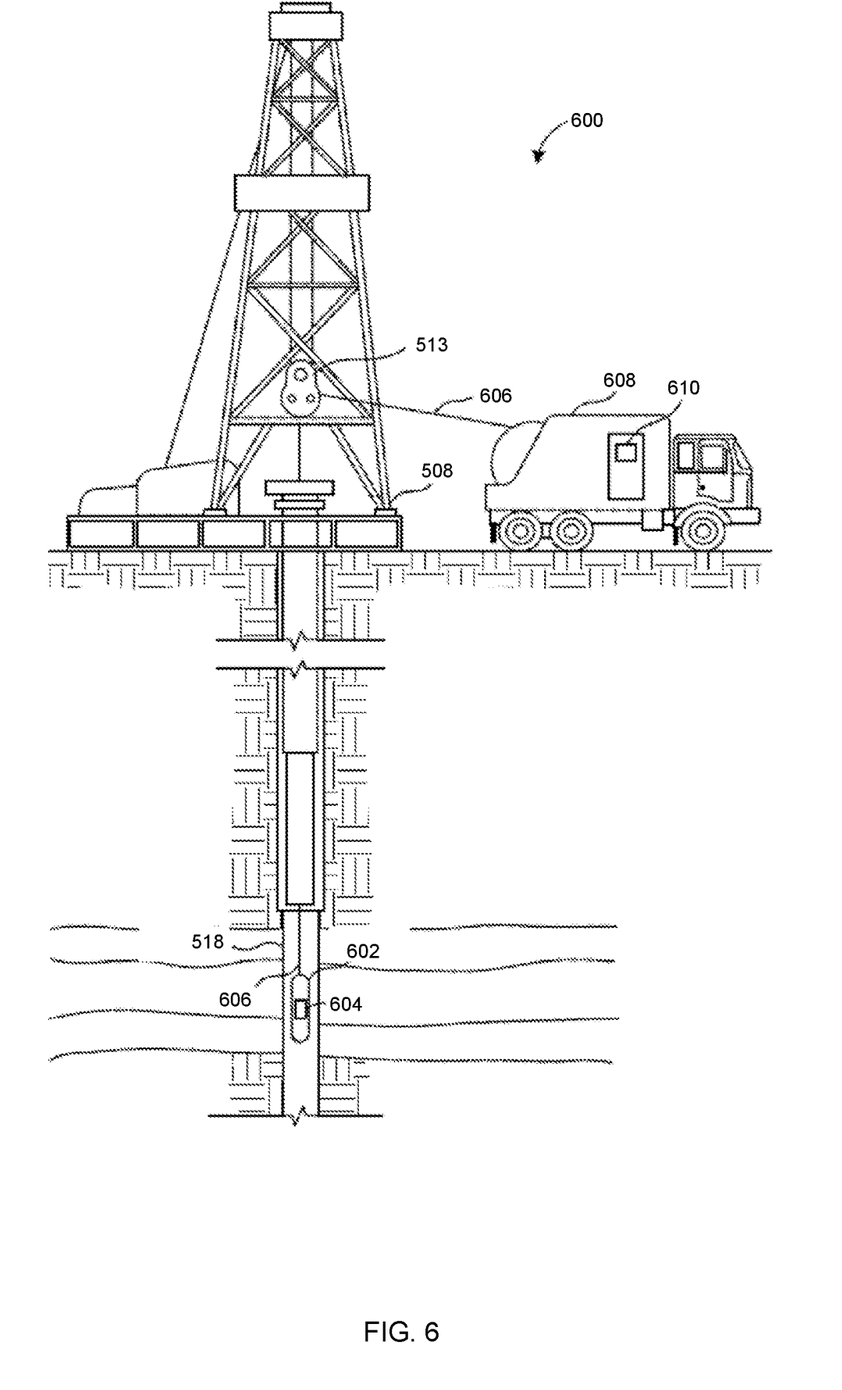
FIG. 6 illustrates a wireline logging system in accordance with some embodiments.

FIG. 6 illustrates a wireline system 600 that may employ one or more principles of the present disclosure. In some embodiments, wireline system 600 may be configured to deploy and operate downhole measurement tools. After drilling of wellbore 518 is complete, it may be desirable to determine details regarding formation material and composition of formation fluids and associated properties through wireline sampling. Wireline system 600 may include a downhole tool 602 that forms part of a wireline logging operation that can include one or more measurement components 604, as described herein, as part of a downhole measurement tool. Wireline system 600 may include the derrick 508 that supports the traveling block 513. Wireline logging tool 602, such as a probe or sonde, may be lowered by a wireline cable 606 into wellbore 518.

Downhole tool 602 may be lowered to potential production zone or other region of interest within wellbore 518 and used in conjunction with other components such as packers and pumps to perform downhole measurements and other well testing and sampling. Measurement components 604 may be configured to measure conditions and responses of the formation materials and fluids, and any measurement data generated by downhole tool 602 and its associated measurement components 604 can be real-time processed for decision-making, or communicated to a surface logging facility 608 for storage, processing, and/or analysis. Logging facility 608 may be provided with electronic equipment 610, including processors for various types of data and signal processing including perform at least some steps in methods consistent with the present disclosure.

Example Computer

Figure 7:
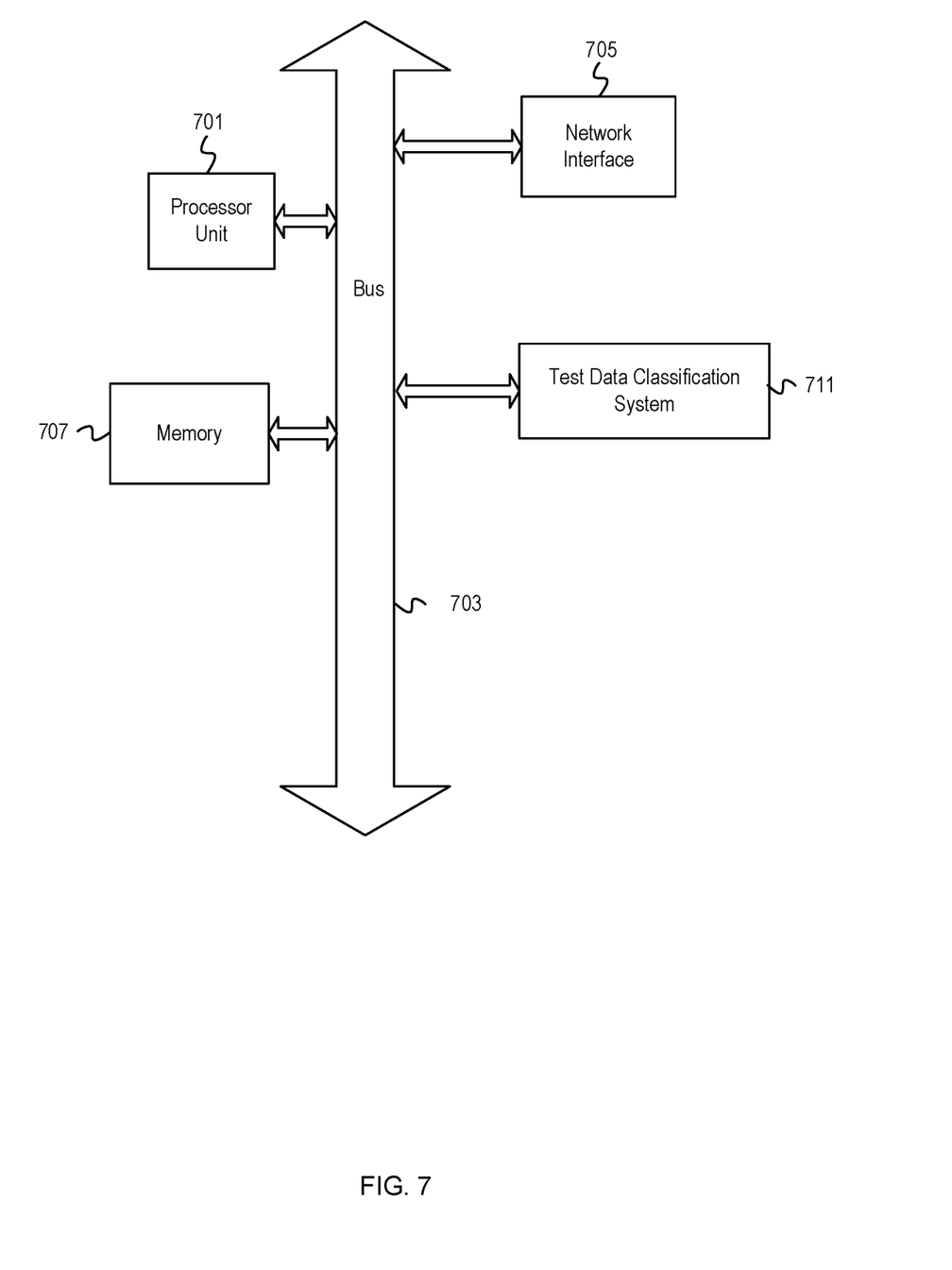
FIG. 7 depicts a computer system for implementing aspects of formation testing in accordance with some embodiments.

FIG. 7 is a block diagram depicting an example computer system that may be utilized to implement control operations for implementing a formation testing operation in accordance with some embodiments. The computer system includes a processor 701 (possibly including multiple processors, multiple cores, multiple nodes, and/or implementing multi-threading, etc.). The computer system includes a memory 707. The memory 707 may be system memory (e.g., one or more of cache, SRAM, DRAM, etc.) or any one or more of the above already described possible realizations of machine-readable media. The computer system also includes a bus 703 (e.g., PCI, ISA, PCI-Express, Infini-Band® bus, NuBus, etc.) and a network interface 705 which may comprise a Fiber Channel, Ethernet interface, SONET, or other interface.

The system also includes a test data classification system 711, which may comprise hardware, software, firmware, or a combination thereof. Test data classification system 711 may be configured similarly to the data processing systems illustrated in FIGS. 1 and 2. For example, test data classification system 711 may comprise instructions executable by the processor 701 to implement any of the previously described functionalities that may be partially (or entirely) implemented in hardware and/or on the processor 701. For example, the functionality may be implemented with an application specific integrated circuit, in logic implemented in the processor 701, in a co-processor on a peripheral device or card, etc.

EXAMPLE EMBODIMENTS

EMBODIMENT 1: A method for classifying test data, said method comprising: determining one or more variable types in a multivariate test vector within a data set; for a plurality of machine-learning models, determining a closest match between variable types used by the machine-learning models and the determined variable types for the test vector; in response to determining a closest match for one machine-learning model, selecting a corresponding machine-learning model and classifying the test vector using the selected machine-learning model; and in response to determining a closest match for multiple machine-learning models, determining a similarity between a probability distribution for the test data set and the probability distributions for the multiple machine-learning models to generate similarity values for each of the multiple machine-learning models; and in response to one of the similarity values exceeding a threshold value, selecting a machine-learning model corresponding to the exceeding similarity value and classifying the test vector using the selected machine-learning model. The method may further comprise in response to two or more of the similarity values exceeding the threshold value, selecting a machine-learning model having a highest cross-validation value among the two or more machine-learning models corresponding to the exceeding two or more similarity values. Said selecting a machine-learning model having a highest cross-validation value may comprise comparing cross-validation values that each represent classification accuracy based on testing using a subset of the training data. Said determining a closest match between variable types may comprise determining a largest number of matching variable types between the test vector and variables included in training data sets for each of the machine-learning models. Said determining one or more variable types in the test vector may include: identifying all variable types test data set; and determining the variable types present in the test vector from among all variable types in the test data set. Said determining a closest match between variable types used by the machine-learning models and the determined variable types for the test vector may comprise determining a closest match between variable types used to train the machine-learning models and the determined variable types for the test vector. Said determining a similarity between a probability distribution for the test data set and the probability distributions for the multiple machine-learning models may comprise calculating distance between data points in the probability distribution for the test data set and data points in the probability distributions for the machine-leaning models. Said determining a similarity between a probability distribution for the test data set and the probability distributions for the multiple machine-learning models may include comparing probability distributions for the same variable types.

EMBODIMENT 2: A non-transitory, machine-readable medium having instructions stored thereon that are executable by a computing device to perform operations comprising: determining one or more variable types in a multivariate test vector within a data set; for a plurality of machine-learning models, determining a closest match between variable types used by the machine-learning models and the determined variable types for the test vector; in response to determining a closest match for one machine-learning model, selecting a corresponding machine-learning model and classifying the test vector using the selected machine-learning model; and in response to determining a closest match for multiple machine-learning models, determining a similarity between a probability distribution for the test data set and the probability distributions for the multiple machine-learning models to generate similarity values for each of the multiple machine-learning models; and in response to one of the similarity values exceeding a threshold value, selecting a machine-learning model corresponding to the exceeding similarity value and classifying the test vector using the selected machine-learning model. The machine-readable medium may further comprise instructions executable by the computing device to perform operations comprising: in response to two or more of the similarity values exceeding the threshold value, selecting a machine-learning model having a highest cross-validation value among the two or more machine-learning models corresponding to the exceeding two or more similarity values. Said selecting a machine-learning model having a highest cross-validation value may comprise comparing cross-validation values that each represent classification accuracy based on testing using a subset of the training data. Said determining a closest match between variable types may comprise determining a largest number of matching variable types between the test vector and variables included in training data sets for each of the machine-learning models. Said determining one or more variable types in the test vector may include: identifying all variable types test data set; and determining the variable types present in the test vector from among all variable types in the test data set. Said determining a closest match between variable types used by the machine-learning models and the determined variable types for the test vector may comprise determining a closest match between variable types used to train the machine-learning models and the determined variable types for the test vector. Said determining a similarity between a probability distribution for the test data set and the probability distributions for the multiple machine-learning models may comprise calculating distance between data points in the probability distribution for the test data set and data points in the probability distributions for the machine-leaning models. Said determining a similarity between a probability distribution for the test data set and the probability distributions for the multiple machine-learning models may include comparing probability distributions for the same variable types.

EMBODIMENT 3: An apparatus for classifying test data, said system comprising: a processor; and a computer-readable medium having instructions stored thereon that are executable by the processor to cause the apparatus to, determine one or more variable types in a multivariate test vector within a data set; for a plurality of machine-learning models, determine a closest match between variable types used by the machine-learning models and the determined variable types for the test vector; in response to determining a closest match for one machine-learning model, selecting a corresponding machine-learning model and classifying the test vector using the selected machine-learning model; and in response to determining a closest match for multiple machine-learning models, determine a similarity between a probability distribution for the test data set and the probability distributions for the multiple machine-learning models to generate similarity values for each of the multiple machine-learning models; and in response to one of the similarity values exceeding a threshold value, select a machine-learning model corresponding to the exceeding similarity value and classifying the test vector using the selected machine-learning model. The instructions may further comprise instructions that are executable by the processor to cause the apparatus to in response to two or more of the similarity values exceeding the threshold value, select a machine-learning model having a highest cross-validation value among the two or more machine-learning models corresponding to the exceeding two or more similarity values. Said selecting a machine-learning model having a highest cross-validation value may comprise comparing cross-validation values that each represent classification accuracy based on testing using a subset of the training data. Said determining a closest match between variable types may comprise determining a largest number of matching variable types between the test vector and variables included in training data sets for each of the machine-learning models.

The invention claimed is:

1. A method for classifying test data from downhole measurement tools, said method comprising:
   determining one or more variable types in a multivariate test vector within a test data set, the test data set generated by the downhole measurement tools in a downhole environment;
   for a plurality of machine-learning models, determining a closest match between variable types used by the plurality of machine-learning models and the determined one or more variable types for the multivariate test vector;
   in response to determining the closest match for one of the plurality of machine-learning models, selecting a corresponding machine-learning model and classifying the multivariate test vector using the corresponding machine-learning model to determine formation properties of the downhole environment;
   in response to determining the closest match for multiple machine-learning models of the plurality of machine-learning models,
      determining a similarity between a probability distribution for the test data set and probability distributions for the multiple machine-learning models to generate similarity values for each of the multiple machine-learning models; and
      in response to one of the similarity values exceeding a threshold value, selecting a machine-learning model corresponding to the exceeding similarity value and classifying the multivariate test vector using the selected machine-learning model to determine formation properties of the downhole environment; and
   controlling well equipment by modifying operation settings of the well equipment based on the classification of the multivariate test vector.

2. The method of claim 1, further comprising:
   in response to two or more of the similarity values exceeding the threshold value, selecting a machine-learning model having a highest cross-validation value among two or more machine-learning models corresponding to the exceeding two or more similarity values.

3. The method of claim 2, wherein said selecting the machine-learning model having the highest cross-validation value comprises comparing cross-validation values that each represent classification accuracy based on testing using a subset of training data.

4. The method of claim 1, wherein said determining the closest match between the variable types comprises determining a largest number of matching variable types between the multivariate test vector and variables included in training data sets for each of the plurality of machine-learning models.

5. The method of claim 1, wherein said determining the one or more variable types in the multivariate test vector includes:
identifying all variable types in the test data set; and
determining the one or more variable types present in the multivariate test vector from among all variable types in the test data set.

6. The method of claim 1, wherein said determining the closest match between the variable types used by the plurality of machine-learning models and the determined one or more variable types for the multivariate test vector comprises determining the closest match between the variable types used to train the plurality of machine-learning models and the determined one or more variable types for the multivariate test vector.

7. The method of claim 1, wherein determining the similarity between the probability distribution for the test data set and the probability distributions for the multiple machine-learning models comprises calculating distance between data points in the probability distribution for the test data set and data points in the probability distributions for the multiple machine-learning models.

8. The method of claim 7, wherein determining the similarity between the probability distribution for the test data set and the probability distributions for the multiple machine-learning models includes comparing probability distributions for the same variable types.

9. A non-transitory, machine-readable medium having instructions stored thereon that are executable by a computing device to perform operations comprising:
determining one or more variable types in a multivariate test vector within a test data set, the test data set generated by the downhole measurement tools in a downhole environment;
for a plurality of machine-learning models, determining a closest match between variable types used by the plurality of machine-learning models and the determined one or more variable types for the multivariate test vector;
in response to determining the closest match for one of the plurality of machine-learning models, selecting a corresponding machine-learning model and classifying the multivariate test vector using the corresponding machine-learning model to determine formation properties of the downhole environment; and
in response to determining the closest match for multiple machine-learning models of the plurality of machine-learning models,
determining a similarity between a probability distribution for the test data set and probability distributions for the multiple machine-learning models to generate similarity values for each of the multiple machine-learning models; and
in response to one of the similarity values exceeding a threshold value, selecting a machine-learning model corresponding to the exceeding similarity value and classifying the multivariate test vector using the selected machine-learning model to determine formation properties of the downhole environment; and controlling well equipment by modifying operation settings of the well equipment based on the classification of the multivariate test vector.

10. The machine-readable medium of claim 9, further comprising instructions that are executable by the computing device to perform operations comprising:
in response to two or more of the similarity values exceeding the threshold value, selecting a machine-learning model having a highest cross-validation value among two or more machine-learning models corresponding to the exceeding two or more similarity values.

11. The machine-readable medium of claim 10, wherein said selecting the machine-learning model having the highest cross-validation value comprises comparing cross-validation values that each represent classification accuracy based on testing using a subset of training data.

12. The machine-readable medium of claim 9, wherein said determining the closest match between the variable types comprises determining a largest number of matching variable types between the multivariate test vector and variables included in training data sets for each of the plurality of machine-learning models.

13. The machine-readable medium of claim 9, wherein said determining one or more variable types in the multivariate test vector includes:
identifying all variable types in the test data set; and
determining the one or more variable types present in the multivariate test vector from among all variable types in the test data set.

14. The machine-readable medium of claim 9, wherein said determining the closest match between the variable types used by the plurality of machine-learning models and the determined one or more variable types for the multivariate test vector comprises determining the closest match between the variable types used to train the plurality of machine-learning models and the determined one or more variable types for the multivariate test vector.

15. The machine-readable medium of claim 9, wherein determining the similarity between the probability distribution for the test data set and the probability distributions for the multiple machine-learning models comprises calculating distance between data points in the probability distribution for the test data set and data points in the probability distributions for the multiple machine-learning models.

16. The machine-readable medium of claim 15, wherein determining the similarity between the probability distribution for the test data set and the probability distributions for the multiple machine-learning models includes comparing probability distributions for the same variable types.

17. An apparatus for classifying test data from downhole measurement tools, said apparatus comprising:
a processor; and
a computer-readable medium having instructions stored thereon that are executable by the processor to cause the apparatus to,
determine one or more variable types in a multivariate test vector within a test data set, the test data set generated by the downhole measurement tools in a downhole environment;
for a plurality of machine-learning models, determine a closest match between variable types used by the plurality of machine-learning models and the determined one or more variable types for the multivariate test vector;
in response to determining the closest match for one of the plurality of machine-learning models, selecting a corresponding machine-learning model and classifying the multivariate test vector using the corresponding machine-learning model to determine formation properties of the downhole environment; and in response to determining the closest match for multiple machine-learning models of the plurality of machine-learning models,
- determine a similarity between a probability distribution for the test data set and probability distributions for the multiple machine-learning models to generate similarity values for each of the multiple machine-learning models; and
- in response to one of the similarity values exceeding a threshold value, select a machine-learning model corresponding to the exceeding similarity value and classifying the multivariate test vector using the selected machine-learning model to determine formation properties of the downhole environment; and control well equipment by modifying operation settings of the well equipment based on the classification of the multivariate test vector.

18. The apparatus of claim 17, wherein the instructions further comprise instructions that are executable by the processor to cause the apparatus to:
- in response to two or more of the similarity values exceeding the threshold value, select a machine-learning model having a highest cross-validation value among two or more machine-learning models corresponding to the exceeding two or more similarity values.

19. The apparatus of claim 18, wherein said selecting the machine-learning model having the highest cross-validation value comprises comparing cross-validation values that each represent classification accuracy based on testing using a subset of training data.

20. The apparatus of claim 17, wherein said determining the closest match between the variable types comprises determining a largest number of matching variable types between the multivariate test vector and variables included in training data sets for each of the plurality of machine-learning models.

* * * * *